No. 643,016. Patented Feb. 6, 1900.
W. THUM.
BICYCLE RACK.
(Application filed Oct. 23, 1899.)
(No Model.) 2 Sheets—Sheet 1.
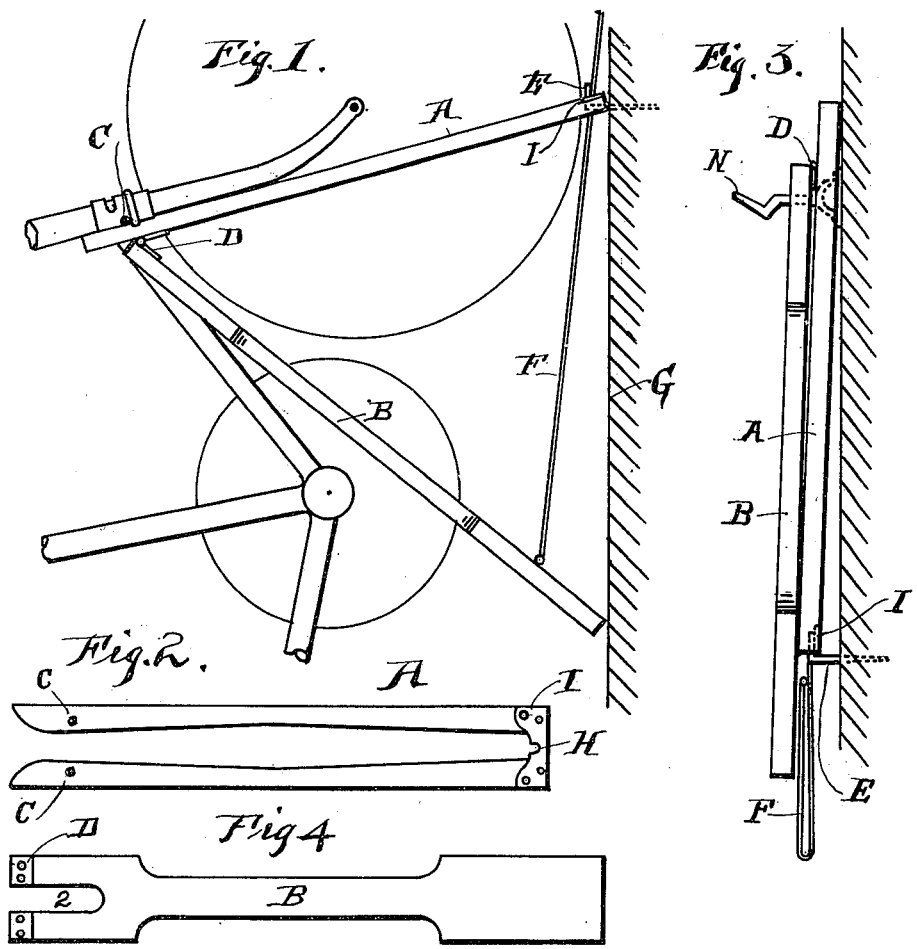
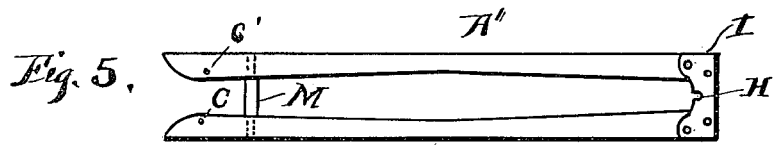
WITNESSES
Harry J. Perkins.
James B. Davies.
INVENTOR.
William Thum
By his ATTORNEY.
Edward Taggart

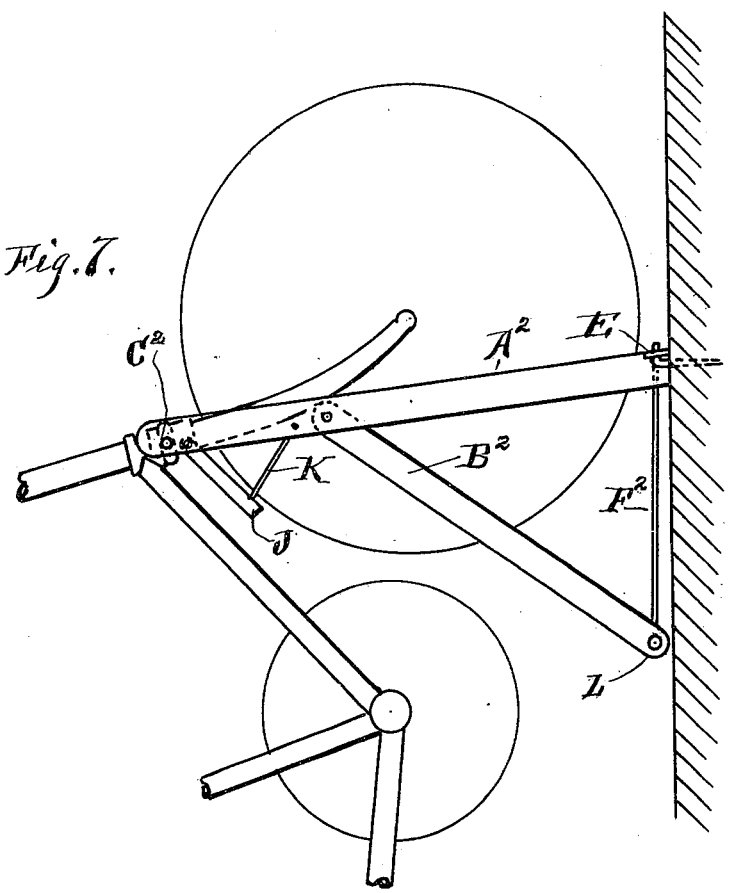

UNITED STATES PATENT OFFICE.

WILLIAM THUM, OF PASADENA, CALIFORNIA.

BICYCLE-RACK.

SPECIFICATION forming part of Letters Patent No. 643,016, dated February 6, 1900.

Application filed October 23, 1899. Serial No. 734,524. (No model.)

*To all whom it may concern:*

Be it known that I, WILLIAM THUM, a citizen of the United States, residing at Pasadena, in the county of Los Angeles and State of California, have invented new and useful Improvements in Bicycle-Racks, of which the following is a specification.

This invention relates to racks for supporting bicycles; and the chief object of the invention is to provide a new and improved rack which is particularly adapted for transportation and storage and to be applied to a wall for receiving and supporting the bicycle either by its wheel or its front fork, the construction being such that the wheel can be introduced longitudinally through the rack and securely retained therein, while the rack is susceptible of being folded into a compact form or folded closely against the wall on which the rack is mounted.

To accomplish this object, my invention involves the features of construction and the combination or arrangement of parts hereinafter described and claimed, reference being made to the accompanying drawings, in which—

Figure 1 shows a side elevation of a rack constructed in accordance with my invention, the rack being unfolded and supporting a bicycle therein. Fig. 2 shows a plan view of the supporting-shelf which receives a portion of the wheel of a bicycle and supporting the bicycle suspended above the floor. Fig. 3 shows the complete rack folded against a perpendicular wall and secured thereto by means of a catch. Fig. 4 shows a plan view of one form of the brace which is used to support the shelf when the shelf is unfolded ready for use. Fig. 5 shows a modified form of shelf. Fig. 6 shows a modified form of brace adapted to be used in connection with the form of shelf shown in Fig. 5. Fig. 7 shows a side elevation of the rack, with the bicycle supported therein, in which the shelf and brace are slightly modified. Fig. 8 shows a plan view of the shelf and brace illustrated in Fig. 7 folded together.

Similar letters and numerals refer to similar parts throughout the several views.

A is the shelf proper, the real support of the bicycle. This shelf A has two side pieces, the outer edges of which are preferably parallel, and in order to make the shelf conform to the spread of the forks of the bicycle toward the hub of the wheel and to give room for the spokes as they spread apart and fasten to the opposite end of the hub the distance between the two parts of the shelf beyond the hub may be contracted toward the end of the shelf which fastens to the wall. The two parts of the shelf are attached together, as shown, by means of a metallic supporting-plate I. This plate I is provided, as shown, with a slot or notch H, which engages with the sustaining-hook E. The hook E is secured to the wall in any suitable manner and is adapted to engage with the shelf both when said shelf is folded and unfolded, as shown in Figs. 1 and 3.

It will be observed that the construction of the shelf A is such that it contains a longitudinal opening which extends through the outer end of the shelf for the purpose of receiving the wheel of the bicycle.

B is a brace or shelf-support, which is hinged or pivoted to the shelf A by means of the hinge D. This brace preferably has its sides cut away, as is shown in Fig. 4, the object being to prevent the brace from interfering or coming in contact with the cranks or pedals of the bicycle. The base B also preferably has a slot 2 in its outer end, as shown in Fig. 4. The slot forms a guide and support for the wheel, receiving the wheel when the bicycle is being raised into position in shelf A, the lower end of the slot acting as a lifting-bar against which the wheel rests while the bicycle is being lifted into position in the rack and while being removed from the rack.

The shelf A may be placed at an incline, as shown in Fig. 1, and when so placed stops are used. These stops consist, preferably, of studs or pins upon the shelf A. The stops C form shoulders or studs which come in contact with the fork of the bicycle and prevent the bicycle from slipping out of the rack. The shelf A, however, may be raised so that its outer end is at the same altitude as its inner end, or even so that the outer end is higher than the inner or wall end of the shelf. When placed in such position, the stop C will not be necessary. In order to adjust the brace B at the required position, I prefer to use a cord F, connecting the wall ends of the shelf and brace and adjusting the distance apart of these two ends and also regulating the angle made by the shelf A with reference to the wall to which it is attached.

Placed on the wall at a suitable distance above the hook E is a catch, (shown by N in Fig. 3.) This catch may be a spring-catch or a gravity-catch or any other suitable catch or button adapted to retain the rack in its folded position against the wall.

In folding the rack after the bicycle has been removed the hinged ends of the shelf and brace are raised, the shelf turning upon the hook E as a pivot, until the upper end of the shelf comes in contact with the inclined part of the catch N, raising the catch and passing under the same and allowing the catch to drop down into the position shown in Fig. 3, retaining the shelf and brace folded in close proximity to the perpendicular wall.

In order to lower the rack for use, it is only necessary to take hold of the lower end of the brace B and pull it away from the wall. This will raise the holding-catch C sufficiently to allow the rack to become disengaged from the catch and to be brought down to its opened or unfolded position and in position to receive a bicycle.

In the modified form shown in Figs. 5 and 6 I have indicated the shelf by A' and the brace by B'. The plate I and the slot H in Fig. 5 are the same as shown in Fig. 2. In the example of my invention shown in Figs. 5 and 6 the brace is shorter, proportionately, than the shelf shown in Figs. 1 and 2. For this reason I have cut out the center of the brace in order to make room for the reception of a part of the front wheel. Inasmuch as the brace cannot be used as a lifting-bar when constructed as shown in Fig. 6, I have provided a bolt M in the shelf, or in place of the bolt M in the shelf the bolt M' in the brace may be used.

The operation of the rack provided with the brace and shelf shown in Figs. 5 and 6 is substantially the same as the operation shown in Figs. 1, 2, and 4.

In Figs. 7 and 8 I have shown a modification which consists in shortening the brace, as shown by B², when compared with the shelf shown by A². The plate I² is also slightly modified, although such modification is not necessary. I also add a bolt L, connecting the inner ends of the brace. I also supply a lifting-shelf or bar J, which bar J is held in position by the cord K, as shown in Fig. 7, and is made to swing in between the two parts of shelf A when the rack is packed for storing and shipping. In this form of my invention the stops shown by C² are placed near the outer end of the shelf and so placed as to project toward each other, as shown in Fig. 8. These stops, however, may be placed in any required position to engage with the fork of the bicycle.

In the form of rack shown in Fig. 7 the head of the fork rests upon the upper end of lifting-bar J, which is located between the two parts of the shelf A, and either prong of the fork rests on the top of brace B, which brace is located between the two-part shelf A. In this form, therefore, the forks rest on inward projections of the shelf A, or, as it were, the bicycle is suspended between the two parts of the shelf instead of resting on the upper side, as in the former figures. I wish to be understood as considering any connection to the shelf proper on which the forks are supported or are supposed to rest as parts of such shelf.

It will be seen that a bicycle-rack constructed in any of the forms shown may be folded against the wall or may be readily removed from the wall and folded for storage or shipment. It is my design that the bicycle be supported upon the shelf, the wheel passing between the two parts of the shelf and the front fork resting in contact with the shelf, thereby suspending the bicycle endwise in close proximity to the perpendicular wall, in which position it will occupy but little room and with my constructed rack may be readily removed from and replaced in the rack, and the rack may be either folded against the wall when not in use or removed from the wall and folded.

Having thus described my invention, what I claim to have invented, and desire to secure by Letters Patent, is—

1. A bicycle-rack, consisting of a shelf having hinges at its inner end for attaching it to a wall and a longitudinal opening extended through its outer end for receiving part of a bicycle, said shelf adjustable to different angles of inclination, and supporting means for securing the shelf at the angle of inclination to which adjusted, substantially as described.

2. A bicycle-rack, consisting of a shelf having means at its inner end for attaching it to a wall and a longitudinal opening extended through its outer end for receiving the wheel of a bicycle therethrough, said shelf being susceptible of adjustment to different angles of inclination, a brace pivotally connected with the outer end of said shelf, and a connection between the inner end portion of the brace and the shelf for adjusting and holding said shelf at different angles of inclination, substantially as described.

3. The combination of a shelf constructed with a longitudinal opening extended through its outer end to receive the wheel of a bicycle, a suitable hinge secured to the shelf and attaching the same to a vertical wall, a brace or support adapted to retain the shelf at any required angle with reference to the wall, and in position for supporting the bicycle, and suitable means for adjusting the shelf to the required angle.

4. The combination with a shelf adapted to receive the front wheel of a bicycle, a brace hinged to said shelf, a pivotal connection between the shelf and a vertical wall, suitable means for adjusting the brace and shelf to place the shelf at the required angle for receiving a bicycle, a suitable catch adapted to retain the shelf and brace in its folded position against the wall, substantially as described.

5. The combination with a shelf having a pivotal connection to a vertical wall, an opening in the shelf extended through the outer end thereof to receive the front wheel of a bicycle, a brace pivoted or hinged to the shelf, an abutment or lifting-bar adapted to assist in placing the bicycle in the rack.

6. The combination with a supporting-shelf adapted to receive and support the front wheel of a bicycle, a detachable pivotal connection between said shelf and a vertical wall, a brace hinged to the outer end portion of the shelf and constructed to bear against a wall to support the shelf at the required position to receive a bicycle when unfolded, and to fold up with the shelf when said rack is not in use, substantially as described.

7. The combination of a suitable supporting-shelf adapted to receive the front wheel and fork of a bicycle, a pivotal connection for attaching the shelf to a vertical wall, a brace hinged or pivoted to the shelf and adapted to support the shelf at any required angle to receive the bicycle, an adjusting device adapted to adjust and retain the brace in a required position, and a catch adapted to secure the shelf and brace in a folded position in close proximity to the vertical wall, substantially as described.

8. The combination in a bicycle-rack of a supporting-shelf adapted to receive the wheel of a bicycle, and a lifting-bar pivotally mounted on said shelf and constructed to support and guide the bicycle-wheel as the bicycle is raised into the rack substantially as described.

9. The combination of a shelf adapted to receive the wheel of a bicycle, a suitable connection between said shelf and a vertical wall, suitable mechanism for retaining said shelf in position to receive the bicycle and a suitable lifting device mounted upon the outer end of said shelf and constructed to receive and support the wheel of the bicycle as the same is lifted into the rack.

10. A rack for a bicycle comprising a divided shelf forming a support for the front forks of the bicycle and between which the front wheel of the cycle is situated when the latter is supported by the rack, the carrying portion of said shelf extending along either side of the front wheel but out of contact with the tire thereof, and means for supporting the shelf.

11. A rack for bicycles comprising in its construction a divided shelf, open in front and adapted to provide a support for the front forks of the cycle, and a lifting-bar or lifting incline having a connection with the shelf, so arranged as not to carry any of the weight of the front wheel when the bicycle is in position.

In testimony whereof I have hereunto set my hand in presence of two subscribing witnesses.

WILLIAM THUM.

Witnesses:
EDWARD TAGGART,
JAMES DAVIES.